(12) United States Patent
Ge et al.

(10) Patent No.: US 11,398,867 B2
(45) Date of Patent: Jul. 26, 2022

(54) LIGHTING AND DETECTING MODULE

(71) Applicant: HASCO VISION TECHNOLOGY CO., LTD., Shanghai (CN)

(72) Inventors: Bin Ge, Shanghai (CN); Tao Zhang, Shanghai (CN); Minghua Zhu, Shanghai (CN); Tianzhong Guo, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 263 days.

(21) Appl. No.: 16/763,019

(22) PCT Filed: Jan. 19, 2020

(86) PCT No.: PCT/CN2020/072955
§ 371 (c)(1),
(2) Date: May 11, 2020

(87) PCT Pub. No.: WO2021/134845
PCT Pub. Date: Jul. 8, 2021

(65) Prior Publication Data
US 2021/0203418 A1  Jul. 1, 2021

(51) Int. Cl.
| | |
|---|---|
| *H04B 10/50* | (2013.01) |
| *G01S 17/931* | (2020.01) |
| *H04B 10/80* | (2013.01) |
| *G01S 7/481* | (2006.01) |
| *H04B 10/116* | (2013.01) |

(52) U.S. Cl.
CPC .......... *H04B 10/503* (2013.01); *G01S 7/4818* (2013.01); *G01S 17/931* (2020.01); *H04B 10/116* (2013.01); *H04B 10/801* (2013.01)

(58) Field of Classification Search
CPC .. H04B 10/503; H04B 10/116; H04B 10/801; G01S 17/931; G01S 7/4818
USPC .......................................................... 356/4.01
See application file for complete search history.

(56) References Cited

U.S. PATENT DOCUMENTS

| | | | |
|---|---|---|---|
| 2009/0066538 A1 | 3/2009 | Thomas et al. | |
| 2013/0282271 A1 | 10/2013 | Rubin et al. | |
| 2014/0347648 A1* | 11/2014 | Roberts | G01S 17/06 398/118 |

(Continued)

FOREIGN PATENT DOCUMENTS

| | | |
|---|---|---|
| CN | 103093645 A | 5/2013 |
| CN | 103531035 A | 1/2014 |

(Continued)

*Primary Examiner* — Dalzid E Singh
(74) *Attorney, Agent, or Firm* — Polsinelli PC (57) ABSTRACT

The present disclosure relates to a lighting and detecting module, which includes: a light source assembly configured to emit lighting light and detecting light; a light transmission component having one end connected to the light source assembly for transmitting the lighting light and the detecting light; a lighting assembly connected to the other end of the light transmission component for receiving the lighting light transmitted by the light transmission component to provide lighting; a light detection and ranging assembly connected to the other end of the light transmission component, for emitting the detecting light transmitted by the light transmission component outward, so as to detect position parameters of a surrounding object.

16 Claims, 6 Drawing Sheets

(56) References Cited

U.S. PATENT DOCUMENTS

| | | | | |
|---|---|---|---|---|
| 2016/0266242 A1* | 9/2016 | Gilliland | ............... | G01S 7/4811 |
| 2018/0219634 A1* | 8/2018 | Laski | ..................... | H04B 10/00 |
| 2019/0039502 A1* | 2/2019 | Licht | ..................... | F21S 41/00 |
| 2019/0257922 A1* | 8/2019 | McCord | ................ | F21S 41/285 |
| 2020/0200363 A1* | 6/2020 | Harrison | ............. | H01S 5/02251 |
| 2021/0011138 A1* | 1/2021 | Pan | ...................... | G01S 7/4815 |

FOREIGN PATENT DOCUMENTS

| | | |
|---|---|---|
| CN | 103903478 A | 7/2014 |
| CN | 104583805 A | 4/2015 |
| CN | 204786017 U | 11/2015 |
| CN | 105844962 A | 8/2016 |
| CN | 106059666 A | 10/2016 |
| CN | 106941513 A | 7/2017 |
| CN | 108445468 A | 8/2018 |
| CN | 108682163 A | 10/2018 |
| CN | 110094692 A | 8/2019 |
| CN | 209341136 U | 9/2019 |

* cited by examiner

LIGHTING AND DETECTING MODULE

CROSS-REFERENCE TO RELATED APPLICATIONS

This application is a National Stage of International Application No. PCT/CN2020/072955, filed on Jan. 19, 2020, which claims priority to Chinese patent application No. 201911424645.7, filed on Dec. 31, 2019. Both applications are hereby incorporated by reference in their entireties.

TECHNICAL FIELD

The present disclosure relates to a field of automobile driving assistance, in particular, to a lighting and detecting module.

BACKGROUND

With the coming of the age of intelligence, intelligent driving technology has been increasingly studied. To assist driving, a position detection device such as laser radar needs to be installed on a vehicle to detect the positional relationship between the vehicle and surrounding objects. The position detection device mostly feeds the distance parameter between the detected object and the vehicle itself directly to the host vehicle to assist driving, thereby avoiding an occurrence of the collision accident.

In practical installation, position detection devices such as laser radar are usually installed at the roof or bumper of the vehicle. There are also solutions to install the laser radar directly into the interior of a vehicle lamp, but these solutions have certain problems: installing it at the roof of the vehicle may cause the appearance of the vehicle to be unsightly, and the short-range blind zone near the vehicle is large; installing it at the bumper position, more wiring harnesses may be added additionally in the vicinity of the engine compartment, and an cleaning system is required additionally; installing the laser radar directly into the interior of the vehicle lamp may cause the volume of the vehicle lamp to be large, and heat generated during the operation of the apparatus may bring additional burden on the heat dissipation of the vehicle lamp.

SUMMARY

Lighting and detecting modules are provided according to various embodiments of the present disclosure.

A lighting and detecting module includes:

a light source assembly configured to emit lighting light and detecting light;

a light transmission component, one end of which connected to the light source assembly for transmitting the lighting light and the detecting light;

a lighting assembly connected to the other end of the light transmission component for receiving the lighting light transmitted by the light transmission component to provide lighting;

a light detection and ranging assembly connected to the other end of the light transmission component, used for emitting the detecting light transmitted by the light transmission component outward, so as to detect position parameters of a surrounding object.

In one of the embodiments, the lighting assembly includes:

a mounting housing forming a cavity which passes through the front and back of the mounting housing;

a fluorescent component disposed at rear end of the mounting housing, in which the fluorescent component is located on a light path of the lighting light transmitted by the light transmission component, and is configured to emit visible light under an excitation of the lighting light;

a light gathering unit disposed on a side of the fluorescent component, and configured to gather the visible light to form a lighting beam and transmit the lighting beam in the cavity;

a lens unit disposed at front end of the mounting housing and configured to form the lighting beam to be a light emitted outward at a certain angle.

In one of the embodiments, the fluorescent component includes:

a heat sink fixed at the rear end of the mounting housing;

a fluorescent sheet fixed at the heat sink and located on the light path of the lighting light, in which the fluorescent sheet is capable of receiving and reflecting the lighting light, the surface of the fluorescent sheet faces the light gathering unit.

In one of the embodiments, further includes a light detection plate provided on a light path of the lighting light reflected by the fluorescent sheet, for detecting energy of the lighting light reflected by the fluorescent sheet.

In one of the embodiments, a surface of the fluorescent sheet is covered with a sapphire sheet, and a heat-dissipating adhesive is filled between the fluorescent sheet and the heat sink.

In one of the embodiments, the fluorescent component includes:

a fluorescent sheet located on the light path of the lighting light, in which the fluorescent sheet is capable of receiving and transmitting the lighting light.

In one of the embodiments, both sides of the fluorescent sheet are provided with sapphire layers.

In one of the embodiments, the light detection and ranging assembly includes a transmitting module and a receiving module. The transmitting module is connected to the other end of the light transmission component, and is configured to emit the detecting light transmitted by the light transmission component outward. The receiving module is configured to receive the reflected light of the detecting light.

In one of the embodiments, the transmitting module is disposed on the side of the lighting assembly, and the lens unit is provided with a light-uniformizing area for uniformizing the detecting light emitted by the transmitting module into a light beam with a uniform light intensity distribution and a specific emitting angle.

In one of the embodiments, the light-uniformizing area is disposed at an edge of a side of the lens unit or is disposed around the lens unit.

In one of the embodiments, the transmitting module is fixed to an inner wall of the mounting housing, and the transmitting module is separated from the lighting beam by a partition.

In one of the embodiments, the transmitting module includes infrared lasers or infrared laser chips, the infrared lasers or infrared laser chips are fixed to the inner wall of the mounting housing through a fixing base, the fixing base is provided with a baffle for separating the transmitting module from the lighting beam.

In one of the embodiments, the light source assembly includes a lighting source for emitting the lighting light and a detecting light source for emitting the detecting light.

In one of the embodiments, a driver of the lighting source is capable of modulating to generate a LiFi signal. The LiFi signal is emitted by the lighting source and is receivable by a LiFi processing device.

In one of the embodiments, further includes a control module, a LiFi processing device and a display system disposed on other vehicles. The control module includes an input end and a control end. The input end is connected to the light detection and ranging assembly for receiving position parameters. The control end is connected to the driver of the lighting source, and is configured to control the lighting source to emit the lighting light and the LiFi signal carrying the position parameters that are receivable by the LiFi processing device through the driver. The LiFi processing device is capable of receiving the LiFi signal and displaying the position parameters through the display system connected to the LiFi processing device.

In one of the embodiments, the light transmission component includes lighting-conducting fibers and detecting-conducting fibers. The lighting-conducting fibers are for transmitting the lighting light to the lighting assembly. The detecting-conducting fibers are for transmitting the detecting light to the light detection and ranging assembly.

More details of the one or more embodiments of the present disclosure will be described in following description and drawings. Other features, objects, and advantages of the present disclosure will be apparent from the specification, drawings, and claims.

BRIEF DESCRIPTION OF THE DRAWINGS

For better describing and illustrating embodiments and/or examples of the invention disclosed herein, reference may be made to one or more drawings. The additional details or examples used to describe the drawings should not be considered as limiting the scope of any one of the disclosed inventions, the presently described embodiments and/or examples, and the best mode of these inventions currently understood.

In the figures, 100—light source assembly, 110—heat dissipating device, 200—light transmission component, 210—lighting-conducting fibers, 220—detecting-conducting fibers, 310—mounting housing, 330—light gathering unit, 340—lens unit, 341—light-uniformizing area, 321*a*—heat sink, 322*a*—fluorescent sheet, 323*a*—heat-dissipating adhesive, 324*a*—sapphire sheet, 325*a*—light detection plate, 326*a*—fixed sheet metal, 400*a*—laser head, 401*a*—lighting light, 322*b*—fluorescent sheet, 324*b*—sapphire layers, 400*b*—laser head, 401*b*—lighting light, 510—transmitting module, 511—infrared laser, 512—fixing base, 5121—baffle, 520—receiving module.

DETAILED DESCRIPTION OF THE EMBODIMENTS

The disclosure will be further illustrated in conjunction with the accompanying drawings.

For the convenience of understanding of the present disclosure, the present disclosure will be described more fully with reference to the relevant drawings. The drawings show preferred embodiments of the present disclosure. However, the present disclosure can be implemented in many different forms and is not limited to the embodiments described herein. Those of ordinary skill in the art will recognize that changes and modifications may be made to the various embodiments described herein without departing from the scope of the present disclosure as defined by the appended claims. In addition, descriptions of well-known functions and constructions may be omitted for clarity and conciseness.

It should be understood that when an element is referred to as being "fixed to" another element, it can be directly on the other element or an intervening element(s) may also be present. When an element is considered to be "connected" to another element, it may be connected directly to another element or there may be an intervening element(s) therebetween at the same time.

Unless defined otherwise, all technical and scientific terms used herein have the same meaning as commonly understood by one of ordinary skill in the art to which this disclosure belongs. The terms used herein in the description of the present disclosure is for the purpose of describing particular embodiments only and is not intended to limit the present disclosure. The term "and/or" as used herein includes any and all combinations of one or more associated listed items.

The lighting light described herein refers to the light emitted by the light source assembly for lighting. In different embodiments, the lighting light may specifically be a laser light for exciting a fluorescent component to emit visible fluorescent light, or may be visible light, such as white light, used directly for lighting.

Figure 1:
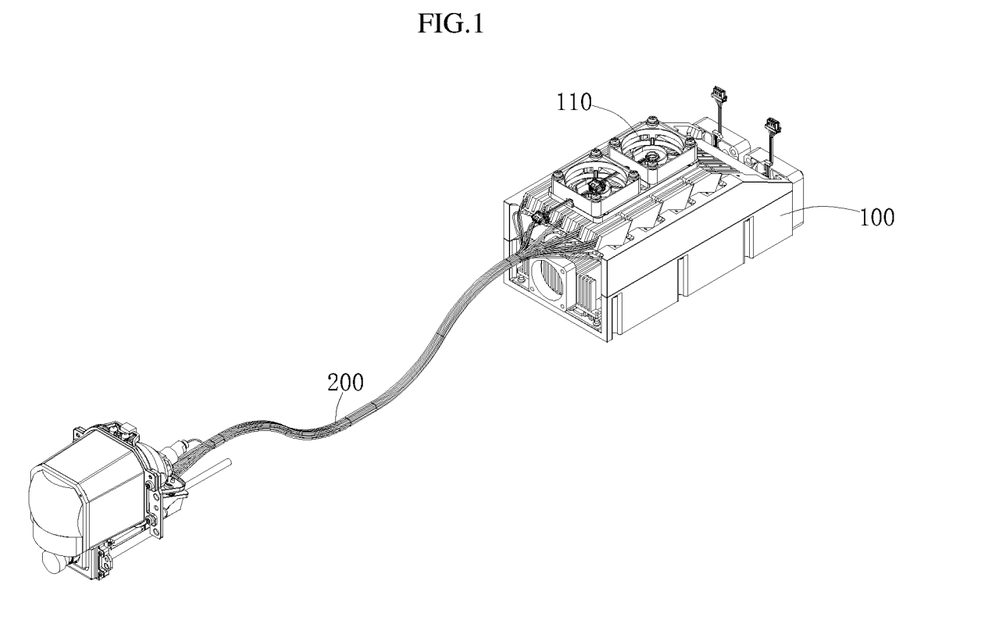
FIG. 1 is a structural schematic view of a lighting and detecting module provided by an embodiment of the present disclosure.

As shown in FIG. 1, in an embodiment of the present disclosure, a lighting and detecting module is provided, which includes a light source assembly 100, a light transmission component 200, a lighting assembly, and a light detection and ranging assembly. The light source assembly 100 is configured to emit lighting light and detecting light. One end of the light transmission component 200 is connected to the light source assembly 100 for transmitting the lighting light and the detecting light. The lighting assembly is connected to the other end of the light transmission component 200 for receiving the lighting light transmitted by the light transmission component 200 to provide lighting. The light detection and ranging assembly is connected to the other end of the light transmission component 200, for emitting the detecting light transmitted by the light transmission component 200 outward, so as to detect and generate the position parameters of the object.

In the above embodiment, the light source assembly 100 is independent of the lighting assembly and the light detection and ranging assembly, and is connected to the lighting assembly and the light detection and ranging assembly through the light transmission component 200, so that the generated lighting light and detecting light can be directly transmitted to the lighting assembly and the light detection and ranging assembly through the transmission component 200, for providing lighting and detecting the position of the object, respectively.

Since the light source assembly 100 is independent of the lighting assembly and the light detection and ranging assembly, the light source assembly 100 which occupies a large volume and generates a large amount of heat can be separated from other functional assemblies. The light source assembly 100 can quickly dissipate heat, if it is flexibly arranged in a place with good heat dissipation and ventilation conditions, for example, inside the engine compartment, inside the cockpit of the vehicle and the other similar position, and thus it is advantageous for extending the overall service life of the apparatus. Moreover, since the light source assembly 100 is independently provided, the light source assembly 100 can be provided in a position that is easily accessed by person when being installed. In this way, it is not only convenient for installation, but also facilitates maintenance and replacement, and facilitates subsequent maintenance.

Since the light source assembly 100 with a larger volume is installed independently, and the volume of the light detection and ranging assembly is smaller and can be arranged adjacent to the lighting assembly, it is advantageous for the overall miniaturization design of the modules. After integrating the light detection and ranging assembly with lighting assembly, the additional space will not be occupied.

Since the light source assembly 100 with a larger volume is provided independently and the heat dissipation problem is solved, the light detection and ranging assembly can be integrated with the lighting assembly and arranged at the installation position of the vehicle lamp, which is advantageous to expand the detection angle and range and reduce the detection blind zone. The connection method of the lighting assembly, the light detection and ranging assembly and the light source assembly 100 is simple. Thus there is no need to arrange a large number of connecting harnesses, thereby simplifying the structure, saving the installation space, and facilitating the subsequent maintenance and inspection.

After combined with the lighting assembly, the light detection and ranging assembly can be fixed inside the vehicle lamp and thus be protected. In this way, the overall appearance of the vehicle is not affected, and it is not contaminated by dust when being provided inside the vehicle lamp. It can share the cleaning system with the vehicle lamp without additional configuration.

Figure 2:
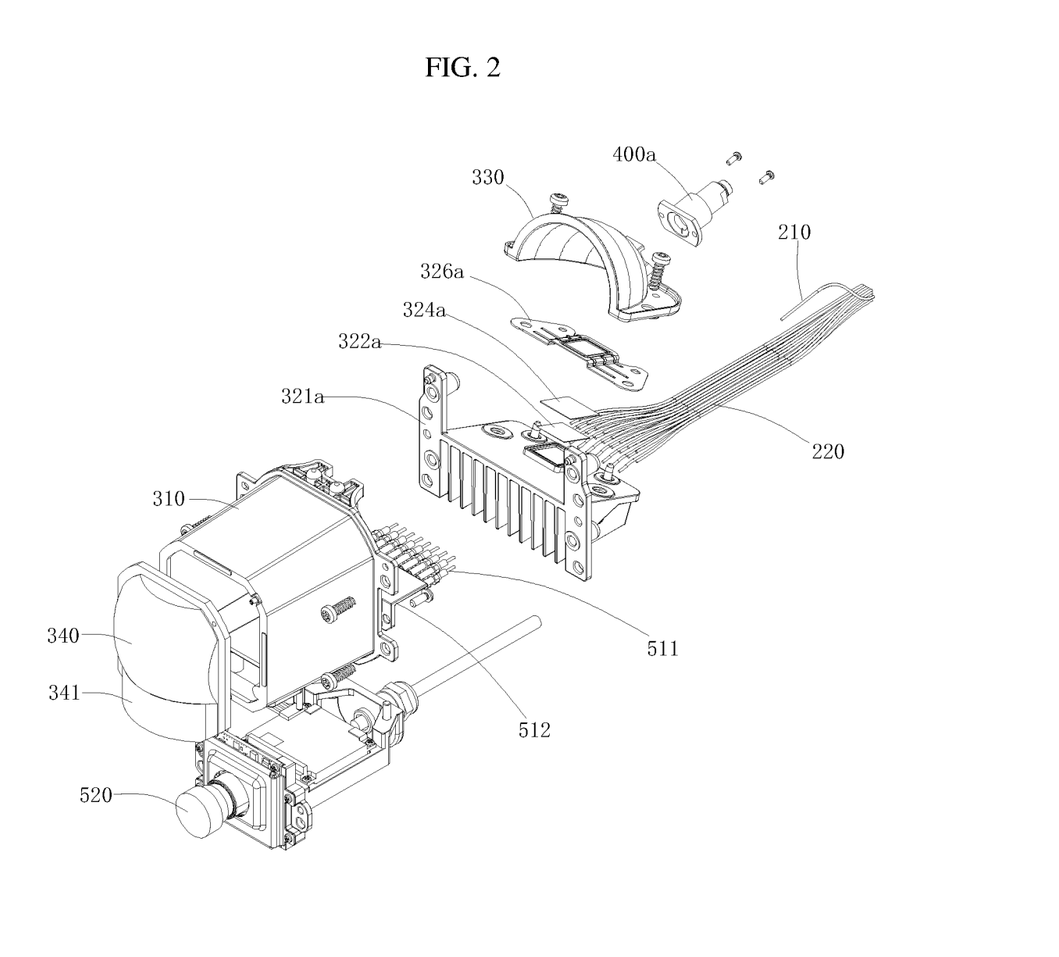
FIG. 2 is an explosive view of a lighting assembly and a light detection and ranging assembly in the lighting and detecting module of FIG. 1.
Figure 3:
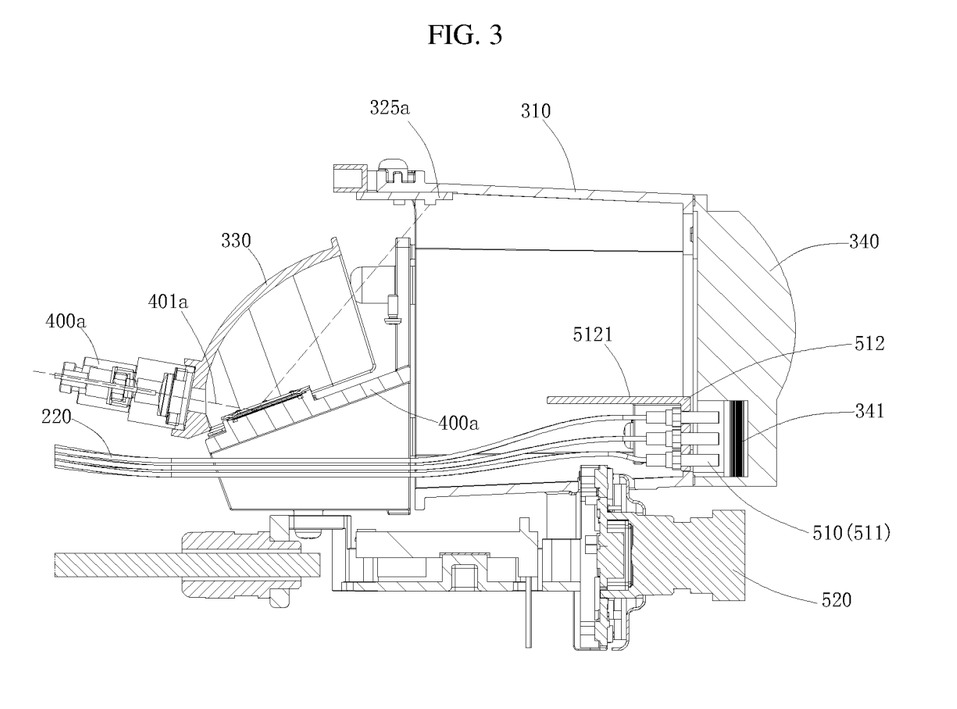
FIG. 3 is a view of interior structure of the lighting assembly and the light detection and ranging assembly in the lighting and detecting module of FIG. 1.

Referring to FIGS. 2 and 3, in some embodiments, the lighting assembly includes a mounting housing 310, a fluorescent component, a light gathering unit 330, and a lens unit 340. The mounting housing 310 is formed with a cavity that passes through the front and back of the housing 310. The fluorescent component is disposed at the rear end of the mounting housing 310, and the fluorescent component is located on the light path of the lighting light transmitted by the light transmission component 200, and is used to emit visible light under the excitation of the lighting light. The light gathering unit 330 is disposed on the side of the fluorescent component, and used to gather the visible light to form a lighting beam and transmit the lighting beam in the cavity. The lens unit 340 is disposed at the front end of the mounting housing 310 and configured to adjust the lighting beam so as to emit it outward at a certain angle.

The light gathering unit 330 may specifically use a reflecting mirror. In this embodiment, the lighting light is used as an exciting light. For example, the lighting light may use a blue laser light with high-energy. Specifically, the lighting light (such as the blue laser light) transmitted to the lighting assembly through the light transmission component 200 may be emitted by a laser head disposed at the rear end of the mounting housing 310. The fluorescent component can undergo energy level transition and emit visible fluorescent light under the excitation of the lighting light. The visible light is gathered by the light gathering unit 330 to form a visible light beam and then passes through the lens unit 340, and thus to be emitted outward to provide lighting.

In this embodiment, the light gathering unit 330 and the lens unit 340 gather the fluorescent light to form a visible light beam, and adjust the visible light beam. The mounting housing 310 provides a space for the transmission of the visible light beam. The visible fluorescent light emitted by the fluorescent component has a high lighting brightness, and has lesser energy consumption than that of lighting used by a conventional method under a condition of requiring the same lighting intensity, which saves costs. In addition, the fluorescent components with different colors can emit lights with different colors after being excited. Exciting the light with required colors can be achieved by providing the fluorescent components with different colors according to the needed actual colors. Thus pre-modulating the light source or replacing different types of the light source assembly 100 can be omitted and the adaptability to different light emission requirements becomes stronger. Accordingly, the structure of the entire lighting and detecting module is simplified and using of it is more convenient.

Figure 4:
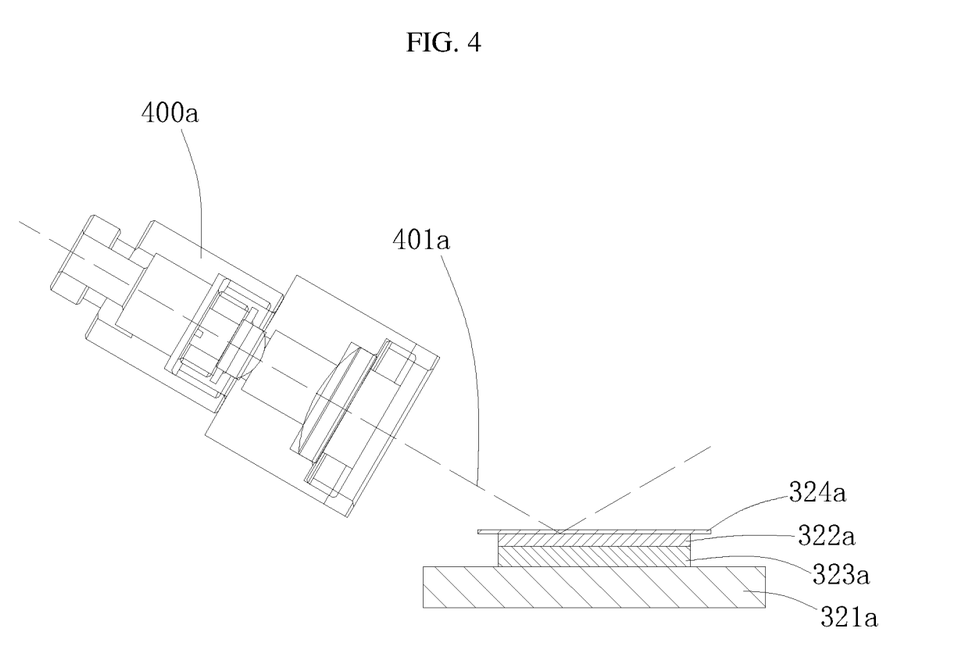
FIG. 4 is a schematic view of a lighting light irradiating on a fluorescent component in the lighting assembly of FIG. 3.

Referring to FIGS. 3 and 4, in some embodiments, the fluorescent component includes a heat sink 321a fixed at the rear end of the mounting housing 310 and a fluorescent sheet 322a which is fixed at the heat sink 321a and located on the light path of the lighting light. The fluorescent sheet 322a can receive and reflect the lighting light. The surface of the fluorescent sheet 322a faces the light gathering unit 330.

Specifically, a lighting light 401a (such as a blue laser light) transmitted by the light transmission component 200 can be emitted by a laser head 400a provided at the rear end of the mounting housing 310. The laser head 400a contains an optical assembly therein, which is configured to preliminarily shape the lighting light. The fluorescent sheet 322a is excited to emit the visible fluorescent light by the irradiation of the lighting light 401a to the surface of fluorescent sheet 322a. The fluorescent light is directly gathered by the light gathering unit 330 to form a visible light beam. The lighting light 401a irradiated to the surface of the fluorescent sheet 322a can be simultaneously reflected by the fluorescent sheet 322a. The heat sink 321a provides an installation space for the fluorescent sheet 322a, and meanwhile, it can timely dissipate the heat generated when emitting the fluorescent light, to avoid the entire apparatus to be damaged due to excessive heat.

In one or more embodiments, the fluorescent sheet 322a is attached to the surface of the heat sink 321a through a heat-dissipating adhesive 323a, to further improve the heat dissipation effect. In addition, after the fluorescent sheet 322a is attached to the heat sink 321a, a fixed sheet metal 326a can be provided around the fluorescent sheet 322a, to prevent the fluorescent sheet 322a comes off.

In one or more embodiments, an included angle between the surface of the fluorescent sheet 322a and the lighting light 401a transmitted by the light transmission component 200 is an acute angle, which can conveniently reflect the lighting light 401a directly outward.

With the configuration of this embodiment, the lighting light 401a can be directly reflected, and the surface of the fluorescent sheet 322a faces the light gathering unit 330, which is advantageous for gathering fluorescent light. Moreover, the fluorescent sheet 322a is directly attached to the heat sink 321*a*, which is convenient to dissipate heat in time, to ensure fluorescent light conversion efficiency.

In one or more embodiments, a light detection plate 325*a* is further included, which is provided on the light path of the lighting light 401*a* reflected by the fluorescent sheet 322*a*, for detecting the energy of the lighting light 401*a* reflected by the fluorescent sheet 322*a*. This is because the lighting light 401*a* (such as a blue laser light) that is the excitation light usually has a higher energy. When the reflected lighting light 401*a* has a higher energy, it will bring damage to the human eyes, especially when the fluorescent sheet 322*a* fails, the lighting light 401*a* is totally reflected by the fluorescent sheet 322*a*. Once it enters the human eyes, it will directly cause blindness. Instead, the light detection plate 325*a* can be used to detect the energy of the lighting light 401*a* reflected by the fluorescent sheet 322*a*. When the detected energy of the light is larger, the light source assembly 100 can be turned off or the lighting power thereof can be reduced, to protect human eyes. When specially using it, the light detection plate 325*a* can be directly connect with the vehicle control component, so that the energy value detected by the light detection plate 325*a* can be fed to the vehicle control component directly. The vehicle control component determines that the light source assembly 100 is automatically turn off or the lighting power thereof is automatically lowered when the detected energy value exceeds an energy threshold that is set internally.

Further, the surface of the fluorescent sheet 322*a* is covered with a sapphire sheet 324*a*. The sapphire sheet 324*a* can increase the light transmittance. On the one hand, it is advantageous for the lighting light 401*a* as the excitation light to transmit through and contact the fluorescent sheet 322*a*. On the other hand, it is advantageous for the fluorescent light generated by the fluorescent sheet 322*a* to transmit through and be incident on the light gathering unit 330.

Figure 5:
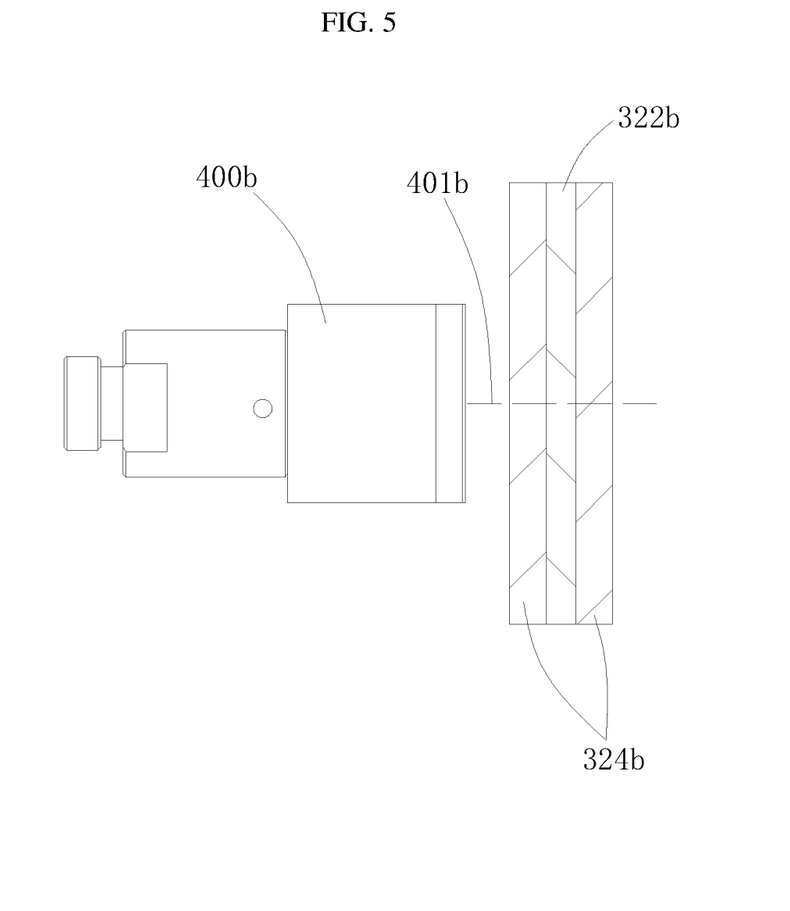
FIG. 5 is a schematic view of the fluorescent component cooperating with the lighting light provided by another embodiment of the present disclosure.

Referring to FIG. 5, in some embodiments, the fluorescent component includes a fluorescent sheet 322*b* located on the light path of the lighting light. The fluorescent sheet 322*b* may receive the lighting light and transmit the lighting light.

Specifically, the lighting light 401*b* (such as a blue laser light) transmitted by the light transmission component 200 may be emitted by the laser head 400*b*. The fluorescent sheet 322*b* is excited by the lighting light 401*b* that is incident on its surface to emit fluorescent light. The lighting light 401*b* can directly pass through the fluorescent sheet 322*b*, so that adopting the configuration of this embodiment can directly transmit the lighting light 401*b*, and the configuration is simple. In one or more embodiments, the surface of the fluorescent sheet 322*b* is at a right angle to the lighting light 401*b* transmitted by the light transmission component 200, which is advantageous for receiving the lighting light 401*b* that is the excitation light as much as possible, and the excess lighting light 401*b* can directly transmit through the fluorescent sheet 322*b* and be emit outward.

Both sides of the fluorescent sheet 322*b* are provided with sapphire layers 324*b*. The sapphire layers 324*b* are configured to dissipate heat and can increase the transmittance of fluorescent light. Specifically, the sapphire layers 324*b* directly attach to the fluorescent sheet 322*b*, and thus it can timely dissipate the heat generated when the fluorescent sheet 322*b* emits fluorescent light, so as to avoid the entire apparatus to be damaged by excessive heat. Meanwhile, the sapphire layer 324*b* can increase the light transmittance. On the one hand, it is advantageous for the lighting light 401*b* that is the excitation light to transmit through and contact the fluorescent sheet 322*b*. On the other hand, it is advantageous for the fluorescent light generated by the fluorescent sheet 322*b* to transmit through and be incident on the light gathering unit 330.

It can be understood that, in other embodiments, the lighting assembly may be a reflection condenser lens provided on the light path of the lighting light transmitted by the light transmission component 200. In this case, the lighting light is directly selected as visible light, and the visible light passes through the reflection condenser lens and is emitted outward to provide lighting. However, the disclosure does not limit thereto.

Referring to FIG. 3, in some embodiments, the light detection and ranging assembly includes a transmitting module 510 and a receiving module 520. The transmitting module 510 is connected to the other end of the light transmission component 200, and is configured to emit the detecting light transmitted by the light transmission component 200 outward. The receiving module 520 is configured to receive the reflected light of the detecting light.

Specifically, the detecting light emitted outward by the transmitting module 510 can be reflected by the surface of an object when it encounters the object. After the reflected light is received by the receiving module 520, the orientation of the object with respect to the light detection and the measurement assembly can be determined based on the incident angle of the received reflected light, and the distance between the object and the light detection and the measurement assembly can be calculated based on the time interval between the receiving of the reflected light and the emitting of the detecting light. The above description is a method of detecting the orientation of surrounding objects by using the principle of light reflection. Of course, in some other embodiments, the orientation of surrounding objects can also be detected by detecting other parameters fed by the detecting light, which are all fall within the protection range of the present disclosure.

Referring to FIG. 3, in some embodiments, the transmitting module 510 is disposed on the side of the lighting assembly, and the lens unit 340 is provided with a light-uniformizing area 341 for uniformizing the detecting light emitted by the transmitting module 510 into a light beam with a uniform light intensity distribution and emitting it at a specific emitting angle. Specifically, the light-uniformizing area 341 may be a microstructure separately processed on the surface of the lens unit 340. When the detecting light (such as an infrared laser light) enters the lens unit 340, the microstructure can shape the detecting light, to make the light transmitted by the lens unit 340 to form an area array laser surface with a uniform light intensity distribution and a specific field angle, thereby achieving the purpose of adjusting the light path of the detecting light. The transmitting module 510 can be disposed on one side of the lighting assembly or around the lighting assembly. Since the transmitting module 510 and the lighting assembly use the same lens unit 340 for light adjustment, one lens unit 340 can be configured to possess both lighting function and detecting function. In this way, element manufacturing cost can be saved, and the combined structure is more compact.

In some embodiments, the light-uniformizing area 341 is disposed at an edge of the side of the lens unit 340 or is disposed around the lens unit 340. Adopting this configuration, the transmitting module 510 is also disposed to be close to the side of the lens unit 340 or is disposed around the lens unit 340, which is advantageous for the overall miniaturization and intensive design of the apparatus.

Referring to FIG. 3, in some embodiments, the transmitting module 510 is fixed to an inner wall of the mounting housing 310, and the transmitting module 510 is separated from the lighting beam by a partition. In this embodiment, the provided partition separates the transmitting module 510 and the light beam, and thus the detecting light emitted by the transmitting module 510 and the lighting beam do not interfere with each other, thereby the case that mutual interference of light signals reduces the use effect can be prevented.

Figure 6:
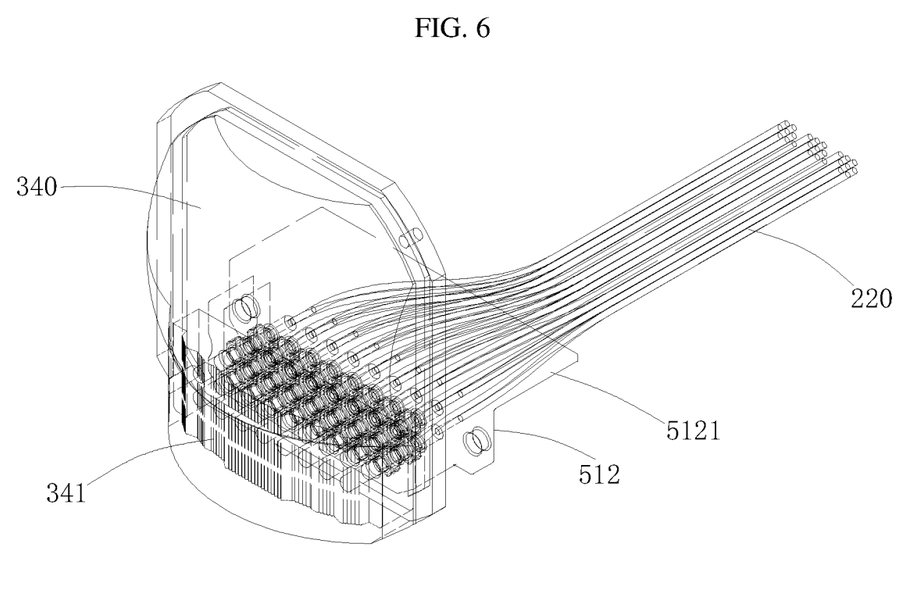
FIG. 6 is a schematic view of a configuration of an emitting module cooperating with a lens unit in the lighting and detecting module of FIG. 1.

Referring to FIG. 3, in some embodiments, the transmitting module 510 includes one or more infrared lasers 511. The infrared laser(s) 511 is fixed to the inner wall of the mounting housing 310 through a fixing base 512. The fixing base 512 is provided with a baffle 5121 for separating the transmitting module 510 from the lighting beam. As shown in FIG. 6, a plurality of infrared lasers 511 are respectively fixed on the fixing base 512, and then the fixing base 512 is inserted into the mounting housing 310 from the rear end of the mounting housing 310. The front end of the infrared lasers 511 face light-uniformizing area 341 on the lens unit 340. The infrared laser light emitted by the infrared lasers 511 is light-uniformized and adjusted by the light-uniformizing area 341 and then passes through the lens unit 340 and is emitted uniformly. The baffle 5121 separates the infrared lasers 511 and the lighting beam, thereby reducing the probability that the infrared laser light emitted by the infrared lasers 511 and the lighting beam interfere with each other, which is advantageous for improving the use effect.

The infrared lasers 511 may be used in conjunction with a receiving module 520 such as an infrared receiver. In one or more embodiments, the receiving module 520 is disposed on the side of the mounting housing 310. Adopting this configuration, the receiving module 520 is adjacent to the lighting assembly, which is advantageous for the overall miniaturization and intensive design of the apparatus. The infrared lasers 511 emit the infrared laser light, thereby making it possible to implement infrared area array detection. The infrared receiver performs the detection by receiving the reflected light of the infrared area array laser light, i.e. combining into flash LiDAR (flash area-array lidar), where the emitted infrared laser light may be a light pulse, or may be a continuous wave. When emitting light pulses, the pulse width can be specially modulated, and thus the case that the apparatuses do not interfere with each other when multiple infrared lasers 511 are operating at the same time can be ensured.

The infrared laser light emitted by the infrared lasers 511 may have a variety of wavelengths, preferably 905 nm, 940 nm, or 1550 nm. Through testing, 905 nm and 940 nm are adopted, because that the infrared laser light having the two wavelength is located in the weak part of the energy distribution of each wavelength of sunlight, which can increase the signal to noise ration of the system. The advantage of adopting 1550 nm is not only that it is located in the weaker part of the energy distribution of wavelength of sunlight, but also that it is safer for the human eyes, and the power output at the transmitting end can be further increased to achieve a longer detection distance.

It can be understood that, in some other embodiments, the light detection and ranging assembly may also adopt other radar technology solutions such as MEMS scanning lidar, mechanical galvanometer scanning lidar, OPA optical phased array lidar, etc., which are not limited herein.

In some embodiments, the light source assembly 100 includes a lighting source for emitting the lighting light and a detecting light source for emitting the detecting light. A heat dissipating device 110 such as an air-cooled heat sink or a water-cooled heat sink may also be disposed on the light source assembly 100, so that the air-cooled or water-cooled method is adopted to dissipate heat generated by the light source assembly 100.

Some position detection devices such as radars installed on current vehicles mostly feeds the distance parameters between the detected objects and the vehicle mounted with radar itself directly to the host vehicle to assist driving and avoid the occurrence of collision accidents. Therefore, the lighting and detecting module of the present disclosure can be installed directly in front of the head of the vehicle to assist driving. However, if a preceding vehicle can also know the collision accident in advance and take measures in time before the collision accident, it will further reduce the probability of traffic accidents, but there is no way to forward the danger information to the preceding vehicle. In addition, when the level of autonomous driving is higher, the current internet of vehicles that relies on 5G or WiFi is suitable for large-scale data interaction, but high-speed private information transmission between specific vehicles cannot be achieved, for example, the distress information, the information on road condition, etc. cannot be transmitted timely between travelling vehicles. Therefore, in some embodiments, the driver of the lighting source can modulate to generate a LiFi signal, which is emitted by the lighting source and can be received by a LiFi processing device (a visible light receiver).

Specifically, when the distance between the vehicle and the preceding vehicle is shorter, a driving signal can be input to the driver of the lighting source through a vehicle console, and the driver of the lighting source modulates and generates a LiFi signal, the LiFi signal is emitted by the lighting source and may be received by the visible light receiver installed on the read end of the preceding vehicle. After the preceding vehicle receives the LiFi signal, it can make subsequent decisions based on different content of the signal. The content of the signal may be a warning information that the distance therebetween is too short, or may be a private information. In this embodiment, the driver of the lighting source can modulate and generate a LiFi signal. The LiFi function is integrated into the lighting function, and the warning information can be sent to the preceding vehicle according to actual needs, thereby providing one way to pass the warning information. After the preceding vehicle gets the situation, it can take measures timely to avoid the occurrence of accidents. The data of the host vehicle can be sent to the vehicle to which the lighting and detecting module can irradiate, such as distress information, entertainment information sharing, information on road condition, etc., so as to realize the shared transmission of private information between the two vehicles. Therefore, the significance of adopting LiFi transmission is also about private information sharing, which can use vehicles as mobile data base stations to share real-time information such as road conditions, locations, weather, and emergency conditions with nearby vehicles. Private information is not easy to be stolen and better privacy is obtained by using LiFi to transmit V2V or V2X information than using other means.

This embodiment enables the lighting and detecting module to further integrate the communication function, increasing the overall functionality and value, and it is more advantageous for catering to consumer needs and market promotion.

In the automatic driving of a vehicle, the distance parameter between the vehicle and the host vehicle detected by the light detection and ranging assembly can be fed directly to the host vehicle to assist driving. However, in a using environment with a lower level of automatic driving, when there is a potential rear-end collision situation, the driver does not have a good way to know the distance information between his own vehicle and a specific vehicle accurately. Therefore, in some embodiments, a control module, a LiFi processing device and a display system disposed on other vehicles is further included. The control module includes an input end and a control end. The input end is connected to the light detection and ranging assembly for receiving position parameters. The control end is connected to the driver of the lighting source, and is configured to control the lighting source to emit the lighting light and the LiFi signal carrying the position parameters that can be received by the LiFi processing device through the driver. The LiFi processing device can receive the LiFi signal and displaying the position parameters through the display system connected to the LiFi processing device.

Specifically, the light detection and ranging assembly detects the position parameters of the preceding vehicle and transmits it to the control module. The control module transmits the information on position parameters to the driver of the lighting source. The driver of the lighting source modulates to generate a LiFi signal. The LiFi signal is sent by the lighting source and can be received by the LiFi processing device installed at the rear end of the ahead vehicle. The LiFi processing device can directly display the position parameters (distance, relative speed, etc.) in the signal through a display system (such as a display screen) disposed at the rear end of the ahead vehicle, which is convenient for the driver of host vehicle to know the information on the distance from the ahead vehicle accurately. In this embodiment, it is provided a good way for the driver of the host vehicle to know the information on the distance from the ahead vehicle, especially when there are many vehicles near the host vehicle, the driver of the host vehicle can know information on the distance from each vehicles in real time. When there is a potential rear-end collision situation, necessary measures such as slowing down, changing lanes, adjusting the driving direction or the like can be taken timely depending on the circumstances, to keep off the vehicles closer to itself to avoid the occurrence of accidents, further reducing the probability of the occurrence of accidents.

Referring to FIG. 2, in some embodiments, the light transmission component 200 includes lighting-conducting fibers 210 and detecting-conducting fibers 220. The lighting-conducting fibers 210 are used for transmitting the lighting light to the lighting assembly. The detecting-conducting fibers 220 are used for transmitting the detecting light to the light detection and ranging assembly. Specifically, two ends of the lighting-conducting fibers 210 may be coupled with the lighting assembly and the light source of the light assembly 100, respectively, for transmitting the lighting light. Two ends of the detecting-conducting fibers 220 may be coupled with the detecting light sources of the light source assembly 100 and the light detection and ranging assembly, respectively, for transmitting the detecting light. In some other embodiments, the light transmission component 200 includes only one fiber. A plurality of fibers arranged in parallel in the fibers can be configured to transmit the lighting light and the detecting light, which are not limited herein.

Each of the technical features of the embodiments described above can be arbitrarily combined. In order to simplify the description, all possible combinations of each technical features in the above embodiments have not been described. However, as long as there is no contradiction in the combination of these technical features, it should be considered as that all of them fall within the scope described in this specification.

The above described embodiments only present several implementation manners of the present disclosure, and descriptions thereof are more specific and detailed, but they cannot be understood as limiting the scope of the invention patent. It should be noted that, to those of ordinary skill in the art, several modifications and improvements can be made without departing from the concept of the present disclosure, which all fall within the protection scope of the present disclosure. Therefore, the protection scope of this invention patent shall be subject to the appended claims.

What is claimed is:

1. A lighting and detecting module, comprising:
 a light source assembly configured to emit lighting light and detecting light;
 a light transmission component, one end of which connected to the light source assembly for transmitting the lighting light and the detecting light;
 a lighting assembly connected to the other end of the light transmission component for receiving the lighting light transmitted by the light transmission component to provide lighting;
 a light detection and ranging assembly connected to the other end of the light transmission component, used for emitting the detecting light transmitted by the light transmission component outward to detect position parameters of a surrounding object.

2. The lighting and detecting module according to claim 1, wherein the lighting assembly comprises:
 a mounting housing forming a cavity passing therethrough;
 a fluorescent component disposed at rear end of the mounting housing, wherein the fluorescent component is located on a light path of the lighting light transmitted by the light transmission component, and is configured to emit visible light under an excitation of the lighting light;
 a light gathering unit disposed on a side of the fluorescent component, and configured to gather the visible light to form a lighting beam and transmit the lighting beam in the cavity;
 a lens unit disposed at front end of the mounting housing and configured to form the lighting beam to be a light emitted outward at a certain angle.

3. The lighting and detecting module according to claim 2, wherein the fluorescent component comprises:
 a heat sink fixed at the rear end of the mounting housing;
 a fluorescent sheet fixed at the heat sink and located on the light path of the lighting light, wherein the fluorescent sheet is capable of receiving and reflecting the lighting light, the surface of the fluorescent sheet faces the light gathering unit.

4. The lighting and detecting module according to claim 3, wherein, further comprises a light detection plate provided on a light path of the lighting light reflected by the fluorescent sheet, for detecting energy of the lighting light reflected by the fluorescent sheet.

5. The lighting and detecting module according to claim 3, wherein a surface of the fluorescent sheet is covered with a sapphire sheet, and a heat-dissipating adhesive is filled between the fluorescent sheet and the heat sink.

6. The lighting and detecting module according to claim 2, wherein the fluorescent component comprises:

a fluorescent sheet located on the light path of the lighting light, wherein the fluorescent sheet is capable of receiving and transmitting the lighting light.

7. The lighting and detecting module according to claim 6, wherein both sides of the fluorescent sheet are provided with sapphire layers.

8. The lighting and detecting module according to claim 2, wherein the light detection and ranging assembly comprises a transmitting module, which is connected to the other end of the light transmission component and configured to emit the detecting light transmitted by the light transmission component outward, and a receiving module configured to receive the reflected light of the detecting light.

9. The lighting and detecting module according to claim 8, wherein the transmitting module is disposed on the side of the lighting assembly, and the lens unit is provided with a light-uniformizing area for uniformizing the detecting light emitted by the transmitting module into a light beam with a uniform light intensity distribution and a specific emitting angle.

10. The lighting and detecting module according to claim 9, wherein the light-uniformizing area is disposed at an edge of a side of the lens unit or is disposed around the lens unit.

11. The lighting and detecting module according to claim 8, wherein the transmitting module is fixed to an inner wall of the mounting housing, and the transmitting module is separated from the lighting beam by a partition.

12. The lighting and detecting module according to claim 11, wherein the transmitting module comprises infrared lasers or infrared laser chips, the infrared lasers or infrared laser chips are fixed to the inner wall of the mounting housing through a fixing base, the fixing base is provided with a baffle for separating the transmitting module from the lighting beam.

13. The lighting and detecting module according to claim 1, wherein the light source assembly comprises a lighting source for emitting the lighting light and a detecting light source for emitting the detecting light.

14. The lighting and detecting module according to claim 1, wherein a driver of the lighting source is capable of modulating to generate a LiFi signal, the LiFi signal is emitted by the lighting source and is receivable by a LiFi processing device.

15. The lighting and detecting module according to claim 14, wherein further comprises a control module, a LiFi processing device and a display system disposed on other vehicles, the control module comprises an input end and a control end, in which the input end is connected to the light detection and ranging assembly for receiving position parameters, the control end is connected to the driver of the lighting source and is configured to control the lighting source to emit the lighting light and the LiFi signal carrying the position parameters that are receivable by the LiFi processing device through the driver, and the LiFi processing device is capable of receiving the LiFi signal and displaying the position parameters through the display system connected to the LiFi processing device.

16. The lighting and detecting module according to claim 1, wherein the light transmission component comprises lighting-conducting fibers for transmitting the lighting light to the lighting assembly and detecting-conducting fibers for transmitting the detecting light to the light detection and ranging assembly.

* * * * *